United States Patent
Webb et al.

(10) Patent No.: US 9,471,263 B2
(45) Date of Patent: Oct. 18, 2016

(54) RESOURCE AUTHORIZATION QUANTITIES

(71) Applicant: HEWLETT-PACKARD DEVELOPMENT COMPANY, L.P., Houston, TX (US)

(72) Inventors: Rowdy K. Webb, Portland, OR (US); Amy Shipman, Portland, OR (US); Jefferson P. Ward, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/763,904

(22) PCT Filed: Apr. 30, 2013

(86) PCT No.: PCT/US2013/038849
§ 371 (c)(1),
(2) Date: Jul. 28, 2015

(87) PCT Pub. No.: WO2014/178844
PCT Pub. Date: Nov. 6, 2014

(65) Prior Publication Data
US 2016/0011827 A1    Jan. 14, 2016

(51) Int. Cl.
*G06F 3/12* (2006.01)
*G07F 17/26* (2006.01)

(52) U.S. Cl.
CPC .......... *G06F 3/1219* (2013.01); *G06F 3/1203* (2013.01); *G06F 3/1229* (2013.01); *G06F 3/1239* (2013.01); *G06F 3/1285* (2013.01); *G07F 17/266* (2013.01); *G06F 3/1273* (2013.01)

(58) Field of Classification Search
None
See application file for complete search history.

(56) References Cited

U.S. PATENT DOCUMENTS

| 7,019,859 | B2 | 3/2006 | Phillips et al. | |
|---|---|---|---|---|
| 7,216,951 | B2 | 5/2007 | Garrana et al. | |
| 8,229,314 | B2 | 7/2012 | Shustef | |
| 2002/0175208 | A1* | 11/2002 | Bartley | G06Q 20/28 235/380 |
| 2003/0011809 | A1* | 1/2003 | Suzuki | G06F 21/608 358/1.15 |
| 2003/0074312 | A1* | 4/2003 | White | G06Q 20/102 705/40 |
| 2007/0003306 | A1* | 1/2007 | Jacobsen | G03G 15/556 399/79 |
| 2007/0188530 | A1 | 8/2007 | Garrana et al. | |

(Continued)

FOREIGN PATENT DOCUMENTS

| JP | 2010250778 | 11/2010 |
|---|---|---|
| KR | 20100138689 | 12/2010 |
| KR | 20110028805 | 3/2011 |
| KR | 20110058679 | 6/2011 |
| KR | 20120110870 | 10/2012 |

OTHER PUBLICATIONS

Flynn, et al., "Kodak Introduces the ESP 1.2. & 3.2 All-in-One Printers and New Pic Flick HD App for iPAD," May 16, 2012, <http://blogit.realwire.com/Kodak-Introduces-the-ESP-12-32-All-in-One-Printers-and-New-Pic-Flick-HD-App-for-iPad>.

(Continued)

*Primary Examiner* — Dung Tran
(74) *Attorney, Agent, or Firm* — HP Inc. Patent Department

(57) ABSTRACT

In one example of the disclosure, a subscription is received. The subscription is to authorize a computing device to at least one of dispense or consume a subscription quantity of a resource. An authorization quantity of the resource is calculated according to a formula that considers a parameter attributable to the subscription. The authorization quantity is to authorize at least one of a dispensation or consumption of the resource at the device. The authorization quantity is sent to the device.

14 Claims, 4 Drawing Sheets

(56) References Cited

U.S. PATENT DOCUMENTS

2008/0170247 A1* 7/2008 Patton .................. H04N 1/2307
  358/1.9
2013/0028616 A1  1/2013 Kunihiro et al.
2014/0355029 A1* 12/2014 Mccoog ............. G06K 15/4095
  358/1.14
2015/0355870 A1* 12/2015 Webb ................ H04N 1/00832
  358/1.15
2015/0370515 A1* 12/2015 Webb .................... G06F 3/1203
  358/1.15

OTHER PUBLICATIONS

International Searching Authority, ISA/KR. International Search Report, Date of mailing Dec. 16, 2013. Application No. PCT/US2013/038849.

* cited by examiner

RESOURCE AUTHORIZATION QUANTITIES

BACKGROUND

Certain computing devices that dispense or consume a resource may subscribe to a resource provider service over a network. The resource provider service enables the device to dispense or consume the resource according to a subscription.

BRIEF DESCRIPTION OF THE DRAWINGS

The accompanying drawings illustrate various examples and are a part of the specification. The illustrated examples do not limit the scope of the claims. Throughout the drawings, identical reference numbers designate similar, but not necessarily identical elements.

DETAILED DESCRIPTION OF EXAMPLES

Figure 1:
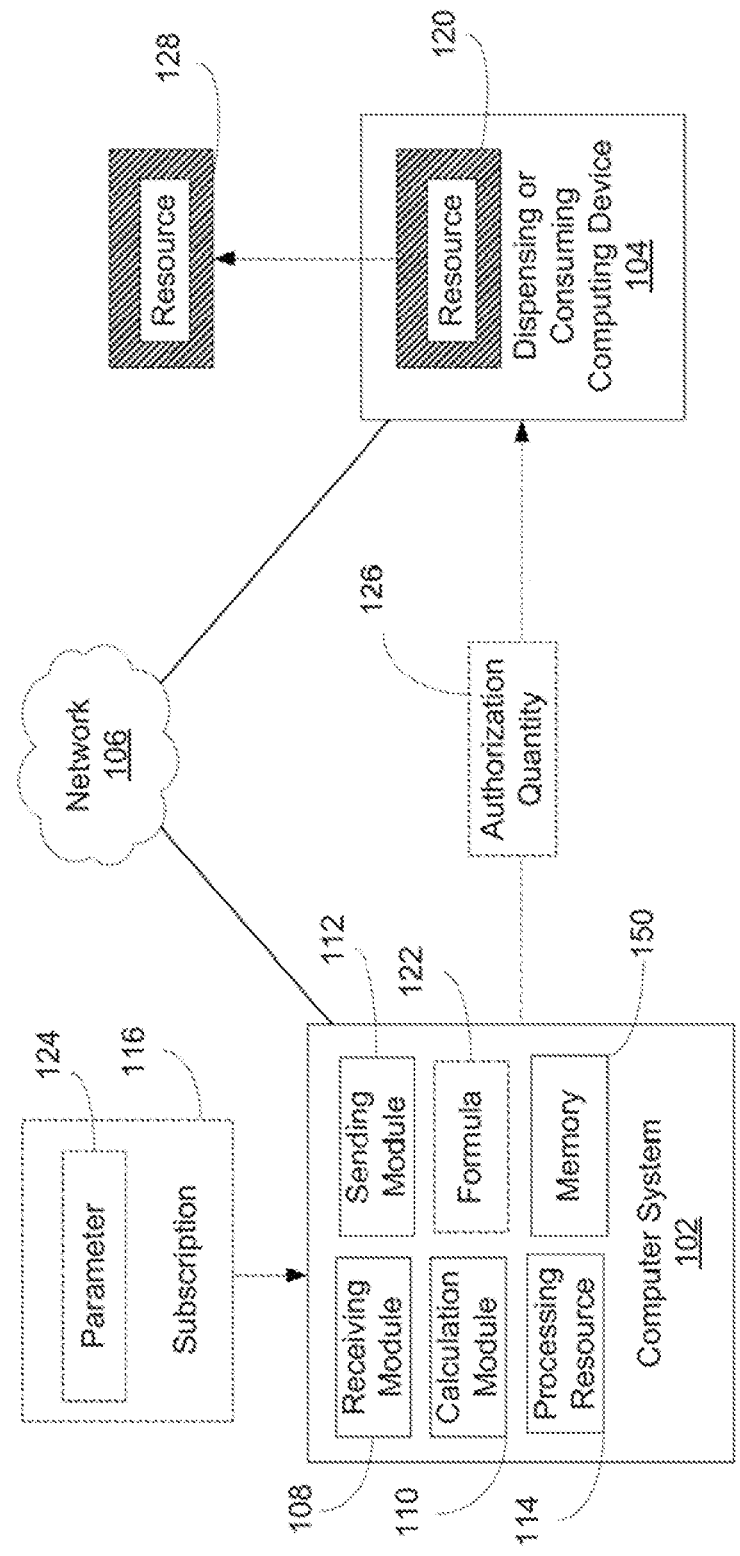
FIG. 1 is a block diagram illustrating a resource authorization system, according to various examples.

Providers of a resource over a network according to subscription services are challenged to provide the resource in a reliable and uninterrupted manner to a consuming or dispensing computing device while maintaining security and ease of use. In an example, a resource provider may, according to a subscription, authorize a dispensing or consuming computing device (hereinafter a "DOC device") to dispense or consume a predetermined quantity of a resource without regard to the amount of the resource physically present at the device. In a particular example, the DOC device is a printing device and the provider may, according to a subscription, authorize the printing device to dispense or consume a predetermined quantity of an ink or other marking element that may be less than the amount of the provider's marking element that is onboard tie printer or otherwise physically available at the printer. In this example where the DOC device is a printer, tie resource provider service may allow the printer to be temporarily enabled to utilize a portion of the onboard quantity of marking element, e.g., marking element for X number of pages to be printed.

While the this model affords the provider and the user of the printer great flexibility in terms of subscription plans and provides the attribute of ease of use, it can be challenging for a provider to determine an authorization quantity of "X" marking element that is appropriate for all users. For example, in some situations if the provider makes the authorization quantity too small, a trusted user of the printer may run out of page credits or otherwise utilize the authorization quantity before the next authorization is received at the printer. This may cause such user to become unhappy with the ink subscription service, the printing device, and/or the provider. On the other hand, if the provider makes the authorization quantity too large, there is the potential that a user new to or unrecognized by the service could take advantage by using the large allocation of ink with no intent to pay for the ink according to a subscription's "pay after" payment terms. In other words, a single authorization quantity value ("X" in the example above) does not fit all users and DOC devices equally well.

To address these issues, examples described herein were developed and may provide a system and method for calculating an authorization quantify for a resource according to parameters of a resource subscription in effect between a provider and DOC device, and providing such quantity to the DOC device to authorize resource consumption and/or dispensation. In an example, a system may include a receiving module, a calculation module, and a sending module. The receiving module may receive a subscription, e.g., from an application executing or accessible to the computing device, or from a computing device. The subscription is to authorize a DOC device to dispense and/or consume a subscription quantity of the resource, The calculation module may calculate, according to a formula that considers a parameter attributable to the subscription, an authorization quantity of the resource. The authorization quantity is to authorize at least one of a dispensation or consumption of the resource at the DOC device. The sending module may send a packet that includes the calculated authorization quantity to the DOC device.

Thus, this disclosure provides a system and a method that enables a resource provider system to create a customized authorization quantity for a DOC device based upon a formula that considers parameters included within or otherwise attributable to a subscription for dispensation or consumption of the resource at the DOC device. In an example, the calculated authorization quantity may be less than the subscription quantity such that authorization quantity is an installment towards the larger subscription quantity. In another example, the calculated authorization quantity equal to or greater than the subscription quantity such that authorization quantity is a fulfillment of the current subscription quantity, or an advance toward a next period subscription quantity. In an example, the formula may consider a subscription parameter that is a duration that the subscription has been in effect, and wherein the formula causes tie authorization quantity to increase as the duration parameter is increased. In an example, the formula may consider a subscription parameter that is a subscription state that is in effect for the device (e.g., a resource supplies ordered and not installed state, a resource supplies ordered and installed state, a subscription suspended state, a subscription cancelled state, a subscription active state, a subscription to be cancelled state, a payment problem state, and/or a no payment problem state).

Advantages of the disclosure are numerous. First, users will appreciate that the disclosed system and method for calculating an authorization quantity for a resource, according to parameters of a resource subscription in effect between a provider and DOC device, and providing such quantity to the DOC device to authorize resource consumption and/or dispensation, enables providers to tailor authorization quantities to unique customer situations. In this manner, a provider computer system is enabled to efficiently and effectively find a compromise between the risk of a bad customer experience (a trusted customer being unable to dispense or consume the ink or other resource as a result of the authorization quantity being too small for the customer's needs) and the business risk of a customer utilizing the resource without paying (as a result of the authorization quantity being too large given the state of the relationship between the provider and the customer). Providers will appreciate the customer goodwill and service call and troubleshooting time saved as a result of the disclosed system and method's dynamic and customized approach to providing resource authorization to a DOC device. Customers will appreciate the continuity of service and time saved as a result of avoiding situations where the authorized resource quantity is too small in light of the customer's printing and the customer's trust characteristics such as time in contract credit history, payment history, etc. These and other advantages of the disclosure will cause users of DOC devices to be more likely to utilize network provider services, and user satisfaction with such DOC devices and the resource provider services will increase, in particular, advantages of the disclosure will cause users of printers to be more likely to utilize network provider services that authorize a printer to utilize marking element according to subscriptions, and user satisfaction with the printers and the resource provider services will increase.

As used in this application, a "resource" refers to any material, supply, consumable, or other tangible asset that can be consumed or dispensed by a device. In a particular example, a resource may be marking element. A "marking element" refers to any substance to be applied to a media by a printer during a printing operation, including but not limited to aqueous inks, solvent inks, UV-curable inks, dye sublimation inks, latex inks, toners, and powders. A "printer" or "printing device" refers to any liquid inkjet printer, solid toner-based printer, liquid toner-based printer, or any other electronic device that prints. "Printer" or "printing device" includes any multifunctional electronic device that performs a function such as scanning and/or copying in addition to printing.

A "subscription" refers to a right, contract, pledge, or other arrangement for a provider to authorize a device to dispense or consume a prescribed amount of a resource for a sum paid, or a fee agreed to be paid, to the provider. A "subscription quantity" refers to the amount of a resource that a device is authorized to dispense or consume, e.g., over a time period, pursuant to a subscription. A "parameter" of, or attributable to, a subscription refers to a numerical or other measurable or observable factor with respect to the subscription and/or a device to dispense or consume resource in connection with the subscription. Examples of subscription parameters include, but are not limited to a duration that the subscription has been in effect, or a subscription state that is in effect for the device. A "subscription state" refers to a then-present condition of the device relative to the subscription or the subscription relative to the device. A "packet" refers to any type of message sent over a network. An "authorization quantify" refers to an amount of a resource that a device is authorized to dispense or consume, e.g., over a time period, that can be less, than equal to, or more than the subscription quantity.

As used herein, a "processing resource" and a "processor" are used synonymously and refer generally any instruction execution system, such as a computer/processor based system or an ASIC (Application Specific Integrated Circuit), a computer, or other system that can fetch or obtain instructions or logic stored in a memory and execute the instructions or logic contained therein. In examples, a processing resource or processor may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processor may include, for example, one processor or multiple processors included in a single computing device or distributed across multiple computing devices.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), flash memory, a storage drive (e.g., a hard disk), any type of storage disc (e.g., a Compact Disc Read Only Memory (CD-ROM), any other type of compact disc, a DVD, etc), and the like, or a combination thereof. Further, any machine-readable storage medium described herein may be non-transitory.

Referring now to the drawings, FIG. 1 is a block diagram illustrating a resource authorization system according to various examples. FIG. 1 includes particular components, modules, etc. according to various examples. However, in different examples, more, fewer, and/or other components, modules, arrangements of components/modules, etc. may be used according to the teachings described herein. In addition, various components, modules, etc, described herein may be implemented as one or more software modules, hardware modules, special purpose hardware (e.g., application specific hardware, application specific integrated circuits (ASICs), embedded controllers, hardwired circuitry, etc.), or some combination of these.

FIG. 1 shows a computer system 102 and a dispensing or consuming computing device ("DOC device") 104, with the computer system 102 and the DOC device 104 each connected to a network 106. Computer system 102 represents generally any computing device or group of computing devices configured to send and receive network, requests, send and receive data, and/or otherwise communicate with other computing devices such as DOC device 104 via network 106. DOC device 104 represents generally any computing device or group of computing devices configured to send and receive network requests, send and receive data, and/or otherwise communicate with other computing devices such as computer system 102, and additionally operable to dispense or consume a resource 120. Network 106 represents generally hardware components and computers interconnected by communications channels that allow sharing of resources and information. Network 106 may include a cable, wireless, fiber optic, or remote connection via a telecommunication link, an infrared link, a radio frequency link, or some combination of these, or any other connectors or systems that provide electronic communication. Network 106 may include, at least in part, an intranet, the internet, or a combination of both. Network 106 may also include intermediate proxies, routers, switches, load balancers, and the like. The paths followed by network 106 between the computer system 102 and the DOC device 104 as depicted in FIG. 1 represent the logical communication paths between these devices, not necessarily the physical paths between the devices.

In the example of FIG. 1, computer system 102 is shown to include a receiving module 108, a calculation module 110, a sending module 112, a processing resource 114, and a memory 150. Memory 150 represents generally any memory configured to store program instructions and other data.

In an example, the receiving module 108 executing at computer system 102 receives a subscription 116. In an example, the subscription is or includes a right, contract, pledge, or other arrangement that is stored at or otherwise accessible to computer system 102, and that authorizes the DOC device 104 to dispense or consume a subscription quantity of a resource 120. In an example, the subscription 116 is received from another computing device. In another example, the subscription 116 is received may be received from memory 150 or from another software or hardware component of computer system 102.

In an example the subscription 116 is sent to, or made accessible to the computer system 102 responsive to a sum being paid, or an agreement that a sum will be paid, to a provider entity or provider user associated with the computer system 102. Frequently the subscription 116 sets the subscription quantity as an amount to be authorized or provided by the provider over a defined time period. As used in this disclosure, a "subscription" is not limited to an arrangement where the fee is prepaid. In an example, the subscription is an arrangement where the fee is to be paid after the dispensation or consumption of the resource. In a particular example, the fee to be paid to a provider pursuant to a subscription may be a fee to be paid at the end of a measuring period (e.g., end of month), e.g., $X at the end of each month to authorize a predetermined consumption of resource 120, e.g., ink to print 500 document pages at the DOC device 104. In another example, the provider computer system 102 may, according to the subscription 110, authorize the DOC device 104 to dispense a subscription quantity of a resource 120 (e.g., ink, milk, juice, grain, fuel, any other resource) according to the subscription 116. In examples, the subscription 116 defines the subscription quantity according to a permitted dispensation of the resource 120 measured by a dispensation or ejection time period, or a subscription quantity of the resource 120 measured by a permitted dispensation volume. In examples, the provider computer system 102 may, according to the subscription 116, authorize the DOC device 104 to dispense or consume a predetermined quantity of a resource 120 that is a portion of, or less than, an amount of the resource 120 that is physically accessible to the DOC device 104.

The calculation module 110 calculates, according to a formula 122 that considers a parameter 124 attributable to the subscription 116, an authorization quantity 126 of the resource 120. In an example, the formula 122 may consider a parameter 124 included within the subscription 116 that is a duration that the subscription has been in effect. In a particular example in which the parameter 124 is a duration that the subscription has been in effect, when other variables are unchanged, the formula 122 causes the authorization quantity 126 to increase as the duration parameter is increased. In another example, the formula 122 may consider a subscription parameter that is a subscription state that is in effect for the device. A subscription state refers to a then-present condition of the device relative to the subscription or the subscription relative to the device. Example subscription states include, but are not limited to, a resource supplies ordered and not installed state, a resource supplies ordered and installed state, a subscription suspended state, a subscription cancelled state, a subscription active state, a subscription to be cancelled state, a payment problem state, and/or a no payment problem state, in examples, the formula 122 may consider both duration and subscription state parameters, in examples, the formula 122 may consider parameters other than duration and subscription state parameters.

The calculated authorization quantity 126 is to authorize the consumption and/or the dispensation of the resource 120 at the DOC device 104. In examples, the calculated authorization quantity 126 is less than the subscription quantity stated or referred to in the subscription 116, such that the authorization quantity 126 is an installment towards the subscription quantity. In other examples, the calculated authorization quantity 126 may be equal to or greater than the subscription quantity such that authorization quantity 126 may be a fulfillment of the subscription quantity or an advance toward a next period's subscription quantity.

In examples, the authorization quantity 126 may be stated in terms of an authorized time of operation. In particular examples, the authorized time of operation may be an allowed dispensation or ejection time period, e.g., "authorization quantity=2 hours consumption" or "authorization quantity=2 hours dispensation." in otter examples, the authorization quantity 126 may be an authorization of DOC device 104 operation to dispense or consume the resource 120 through a defined date. In a particular example, the calculated authorization quantity 126 be in the form "authorization quantity=unlimited dispensation of resource through 12:00 a.m. Jun. 1, 2013."

Following the calculation module's 110 calculating of the authorization quantity 126, the sending module 112 sends the authorization quantity 126 to the DOC device 104. In an example, the DOC device 104 in turn accesses and utilizes the received authorization quantity 126 to determine how much of the resource 120 can be consumed or dispensed at the DOC device 104, and consumes or dispenses a portion 128 of the subscribed-for resource 120. In an example, the DOC device 104 may be limited to dispense or consume only the authorization quantity 126 of the resource 120. In an example, when the amount of the resource 120 indicated by the authorization quantify value is consumed or dispensed by the DOC device 104, the DOC device 104 may be prohibited from further dispensation or consumption of the resource until a new authorization quantity is received from the computer system 102. In an example, resource dispensation or consumption at DOC device 104 after dispensation or consumption of the authorization quantity may be prohibited irrespective of a circumstance that additional resource 120 is onboard or otherwise physically available to the DOC device 104. In an example, resource dispensation or consumption at DOC device 104 after dispensation or consumption of the authorization quantity 126 may be prohibited irrespective of a circumstance that the subscription amount provided for by the subscription 126 has not yet been consumed or dispensed by the DOC device 104.

The functions and operations described with respect to the receiving module 108, the calculation module 110, the sending module 112, and the computer system 102 may be implemented as a non-transitory computer-readable storage medium containing instructions executed by a processor (e.g., processing resource 114) and stored in a memory (e.g., memory 150). In a given implementation, processing resource 114 may represent multiple processors, and memory 150 may represent multiple memories.

Figure 2:
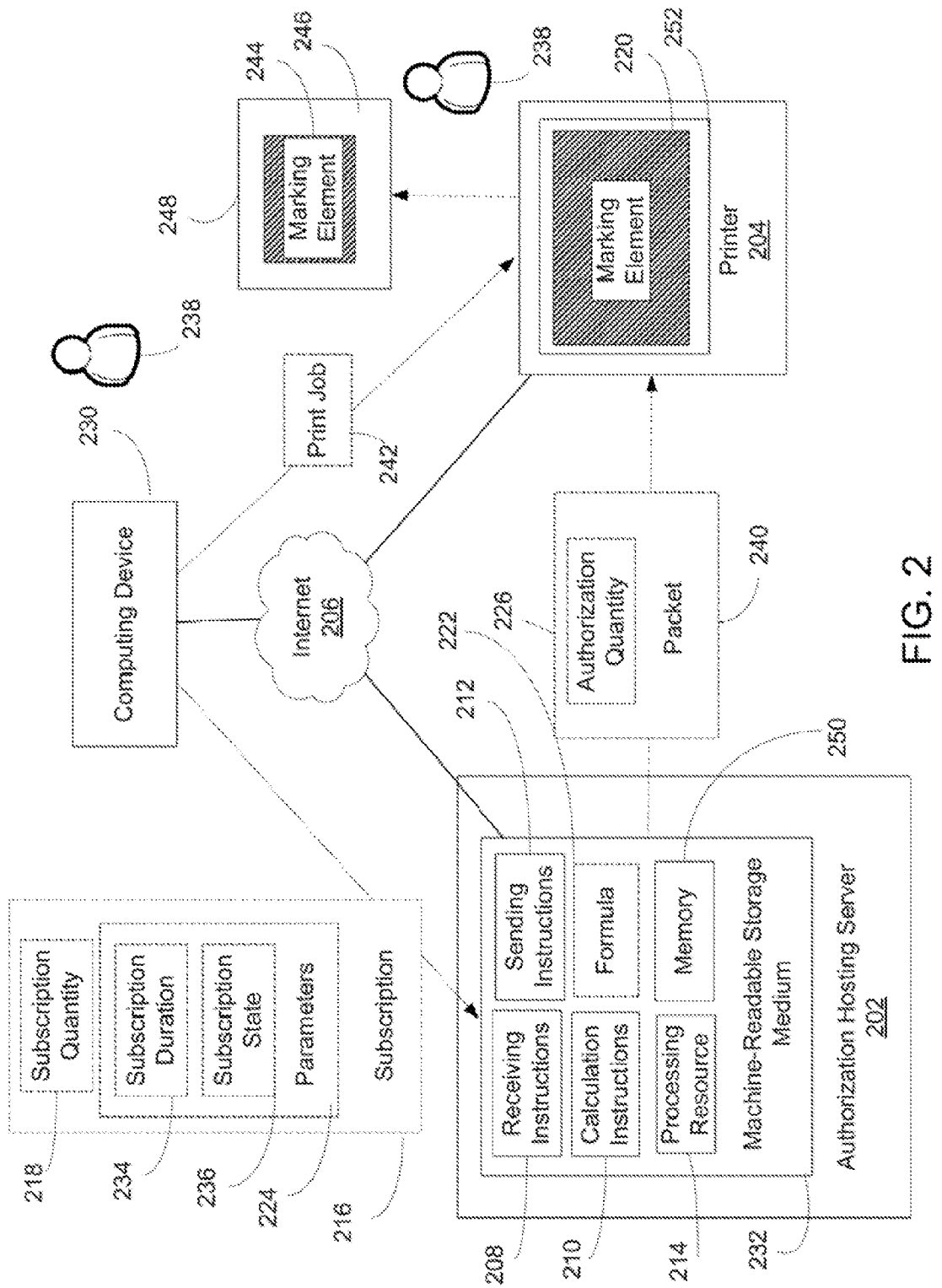
FIG. 2 is another block diagram illustrating a resource authorization system, according to various examples.

FIG. 2 is a block diagram illustrating a resource authorization system according to various examples. FIG. 2 shows an authorization server 202, a printer 204, and a subscription and print job sending computing device 230, each electronically connected to an internet 206. Authorization hosting server 202 represents generally any computing device or group of computing devices configured to send and receive network requests, send and receive data, and/or otherwise communicate with printer 204 other computing devices via internet 206. Printer 204 represents generally any computing device Of group of computing devices operable to dispense or consume a marking element resource to produce a printed print job or printed content, and additionally operable to send and receive internet requests (including receiving printable content and print jobs from a subscription and job sending computing device 230, and receiving packets including resource authorization quantities from authorization hosting server 202), and otherwise communicate other computing devices via tie internet 206. Subscription and job sending computing device 230 represents generally any computing device or group of computing devices configured to send and receive network requests, send and receive data, including sending a subscription to the authorization hosting server 202 and sanding a print job to printer 204, and/or otherwise communicate with printer 204 other computing devices via internet 206. internet 206 may include, at least in part, an intranet, the internet, or a combination of both. The paths followed by internet 206 between the server 202, printer 204, and the subscription and job sending computing device 230 as depicted in FIG. 2 represent the logical communication paths between these devices, not necessarily the physical paths between the devices.

In an example, server 202 includes a processing resource 214 and a machine-readable storage medium 232 encoded with receiving instructions 208, calculation instructions 210, and sending instructions 212. In an example, the instructions 208 210 212 cause the server 202 to implement a service to send packets including resource authorization quantities to printer 204. In some examples, storage medium 232 may include additional instructions. In other examples, instructions 208 210 212 and any other instructions described herein in relation to storage medium 232 may be stored on a machine-readable storage medium remote from but accessible to computing device 202 and processing resource 214.

Processing resource 214 may fetch, decode, and execute instructions stored on storage medium 232 to implement the functionalities described below. In other examples, the functionalities of any of the Instructions of storage medium 232 may be implemented in the form of electronic circuitry, in the form of executable instructions encoded on a machine readable storage medium, or a combination thereof.

In examples, server 202 may be any sort of a computing device. In some examples, server 202 may implement at least a portion of a service to send packets including resource authorization quantities to printer 204. In some examples, instructions 208 210 212 may be part, of a larger set of instructions implementing such a resource authorization quantity service. In some examples, portions of a resource authorization quantity service may be implemented on different computing devices.

In the example of FIG. 2, receiving instructions 208 stored at machine readable storage medium 232 cause the authorization hosting sever 202 to receive a subscription 216. In this example, the subscription 216 is sent to the server 202 by a subscription and job sending computing device 230 via the internet 206. In an example, the subscription may he sent to the server 202 as a result of a user 238 having interacted with a marking element provision service web page hosted by server 202. In an example the subscription 216 is sent to, or made accessible to the server 202 responsive to a sum being paid, or an agreement that a sum will be paid, to a provider entity or provider user associated with the server 202.

In an example, the subscription 216 is an arrangement where the fee is to be paid after the dispensation or consumption of the resource 220, A particular example of a subscription 216 for utilization of marking element 220 at a printer 204 follows:

subscription quantity=$4.99/month, 100 pages included per month, $1 per 20 pages for additional pages per month;
payment due: 30 days after end of month usage report:
subscription duration: active for 6 months;
subscription state: active (not cancelled or to be cancelled);
subscription state: resource supplies ordered and installed;
subscription state: no payment problems.

The calculation instruction 210 causes the server 202 to calculate, according to a formula 222 that considers parameters 224 included within the subscription 216, an authorization quantity 226 of the marking element 220. The authorization quantity 226 is to authorize the printer 204 to dispense or consume the authorization quantity 226 of marking element 220 at the printer 204. In an example, the formula 222 may consider a subscription duration parameter 234 included within the subscription 216 that is a duration that the subscription 216 has been active, in place, or in effect. In a particular example, the formula 222 may be such that the subscription duration parameter 234 causes the authorization quantity 226 to increase as the subscription duration parameter 234 is increased. In an example, the formula 222 may alternatively or additionally consider a subscription state parameter 236 with respect to printer 204. In examples, a subscription state refers to a then-present condition of the printer 204 relative to the subscription 216 or the subscription 216 relative to the printer 204.

In an example, the subscription state parameter 236 is a subscription state in effect for the printer 204 that is one of "a marking element ordered and not installed state", or a "marking element ordered and installed state". The "resource supplies ordered and not installed state" is a state where an order has been placed, pursuant to the subscription, a provider to send a physical supply of ink, toner or another marking element 220 to an entity or user, but the ordered marking element is not yet physically available to or accessible by the printer 204. The "marking element ordered and installed state" is a state where the order for a physical supply of marking element 220 has been placed pursuant to the subscription, and the provider has sent the physical supply of marking element 220 to the entity or use, such that the marking element 220 is installed, onboarded, or otherwise physically available to or accessible by the printer 204. In a particular example the formula 122 may be such that, when other formula variables are not changed, the formula 122 causes the calculated authorization quantity to be lower when the subscription slate is the resource supplies ordered and not installed state than when the subscription state is the resource supplies ordered and installed state. This example of a formula 122 incorporates a premise that a customer user 238 associated with a printer that is in a "marking element ordered and installed state" state is less likely to make an unauthorized use of marking element than a customer user 238 associated with a printer that is in "marking element ordered and not installed state."

In another example, the subscription state parameter 236 is a subscription state in effect for the printer 204 that is one of "a "subscription suspended" state or a "subscription cancelled" state. In a particular example, the formula 222 may be such that the subscription state parameter 236 indicative of a "subscription suspended" state causes the calculated authorization quantity 226 to be zero. In another particular example, the formula 222 may be such that the subscription state parameter 236 indicative of a "subscription cancelled" state causes the calculated authorization quantity 226 to be zero.

In another example, the subscription state parameter 236 is a subscription state in effect for the printer 204 that is one of a "subscription active" or a "subscription to be cancelled state." In a particular example, the formula 222 may be such that the subscription state parameter 236 indicative of a "subscription to be cancelled" state causes the calculated authorization quantity 226 to be, if other formula variables are unchanged, lower than when the subscription state is a "subscription active state." This example of a formula 122 integrates a premise that a customer user 238 associated with a printer that is in an "active" state is less likely to make an unauthorized use of marking element than a customer user 238 associated with a printer that is in "subscription to be cancelled" state.

In another example, the subscription state parameter 236 is a subscription state in effect for the printer 204 that is one of a "payment problem" state or a "no payment problem" state. In examples, a "payment problem" state may be a state reflective of a customer user's credit history, payment history, credit rating, difficulty billing in connection with the subscription (e.g., rejected credit cards, inconsistent or incomplete population of billing data, etc.) or other indicator of likelihood to make timely payment for marking element 220 provided to the printer pursuant to the subscription 216. In a particular example, the formula 222 may be such that the subscription state parameter 236 indicative of a "payment problem" state causes the calculated authorization quantity 226 to be, if other formula variables are unchanged, lower than when the subscription state is a "no payment problem." This example of a formula 122 adopts a premise that a customer user 238 associated with a printer that is in a "no payment problem" state is less likely to make an unauthorized use of marking element than a customer user 238 associated with a printer that is in "payment problem" state.

A particular example of a formula 222 that incorporates subscription duration parameters 234 and subscription state parameters 236 follows:

Authorized Pages=state_scalar $X$((plan_pages_scalar×plan_pages)+(months_active_scalar $X$ plan_pages$X$ Months_in_active_subscription)).

This example of a formula 222 considers subscription duration parameters 234 ("months_active_scalar" and "months_in_active_subscription") and subscription state parameters 236 ("state_scalar", "plan_pages_scalar", and "plan_pages"). In other examples, the formula 222 may consider parameters 224 other than the subscription duration parameter 234 and subscription state parameters 236. In this example, the calculated authorization quantify 226 ("authorized pages") is stated in terms of pages authorized for printing. In another example of a formula 222, the authorization quantity 226 might be stated in terms of a marking element quantity that is approved for dispensation or consumption at the printer 204.

If should be noted that the example subscription state names "marking element ordered and not installed state", "marking element ordered and installed state", "subscription suspended", "subscription cancelled", "active", "subscription to be cancelled", "payment problem", and "no payment problem" are illustrative and such state names are not meant to be exclusive nomenclature. Further, the list of subscription states is not meant to be exclusive. Other subscription states are possible and contemplated by this disclosure.

The calculated authorization quantity 226 is to authorize the consumption and/or the dispensation of the marking element 220 at the printer 204. In examples, the calculated authorization quantity 226 is less than the subscription quantity stated or referred to in the subscription 216, such that the authorization quantify 226 is an installment towards the subscription quantity.

Following the calculation instructions 210 causing the server 202 to calculate the authorization quantity 226, the sending instructions 212 cause the server 202 to send a packet 240 that includes the authorization quantity 226 to the printer 204. In examples, a packet may be any type of message sent over a network. In a particular example, a packet 240 may be or include a formatted unit of data carried by a packet mode computer network. In an example, the printer 204 in turn accesses and utilizes the received authorization quantity 226 to determine how much of the marking element 220 can be consumed or dispensed at the printer 204, and the printer 204 is thereby limited to dispense or consume only the authorization quantity 226 of the marking element 220 In an example, dispensation or consumption of marking element 220 at printer 204 alter dispensation or consumption of the authorization quantity 226 is disallowed irrespective that additional marking element 220 subject to the subscription 216 may be onboard or resident, e.g., at a tank or reservoir 252, at the printer 204 or otherwise available to the printer 204.

In an example, the packet 240 may also include an amount of the resource accumulated at a given time or a cumulative amount of marking element 220 authorized for use at the printer 204, physically sent to the printer 204, and/or consumed or dispensed by the printer 204. Even though a single packet 240 is shown in FIG. 2, the server 202 may provide a plurality of packets 240 over at different intervals of times, such as one packet 240 per day. In an example, if the subscription 216 relates to a monthly subscription for printing at printer 204, the server 202 may send the packet 240 every day to the printer 204 indicating a total amount of pages available to the printer 204 at the lime the packet 240 is sent.

In this example, at a time following the server 202 sending of the packet 240 with the authorization quantity 226 to the printer 204, the subscription and job sending computing device 230 sends a print job 242 to the printer 204. Upon receipt of the print job 242, the printer 204 performs a printing operation that dispenses a portion 244 of the marking element 220 that is less or equal to than the authorization quantity 226 upon a media 246 to create printed output 248.

It should be noted that while in this example the subscription and job sending computing device 230 sent both the subscription 216 to server 202 and sent print job 242 to the printer 204, this is not required. In other examples, a first computing device may send a subscription to the server 202, and a second computing device may send a print job or print jobs to the printer 204. In other examples, the subscription 216 that is received pursuant to receiving instructions 208 may be received from memory 250 or from another software or hardware component of server 202.

In examples, the sending of the subscription 216 from the subscription and print job sending computing device 230 to the authorization hosting server 202, the sending of the packet 240 inducting the authorization quantity 226 from the sewer 202 to the printer 204, and/or the sending of tie print job 242 from the subscription and print job sending computing device 230 is over the internet 206 via a networking protocol. The networking protocols utilized may include, but are not limited to, Transmission Control Protocol/internet Protocol ("TCP/IP"), HyperText Transfer Protocol ("HTTP"), and/or Session Initiation Protocol ("SIP").

In some examples, the receiving instructions 208, calculation instructions 210, and sending instructions 212 may be part of an installation package that, when installed, may be executed by processing resource 214 to implement the functionalities described herein in relation to the instructions 208 210 212. In such examples, storage medium 232 may be a portable medium, such as a CD, DVD, or flash drive, or a memory maintained by a server from which the installation package can be downloaded and installed. In other examples, the instructions 208 210 212 may be part of an application or applications already installed on server 202 including processing resource 214. In such examples, the storage medium 232 may include memory such as a hard drive, solid state drive, or the like. While in the example of FIG. 2 the storage medium 232 and memory 250 appear as separate components or modules, in other examples some or all of memory 250 may be included within or a part of storage medium 232. In yet other examples, some or all of storage medium 232 may be included within or be a part of memory 250. In some examples, functionalities described herein in relation to FIG. 2 may be provided in combination with functionalities described herein in relation to any of FIGS. 1, 4, or 5.

Figure 3:
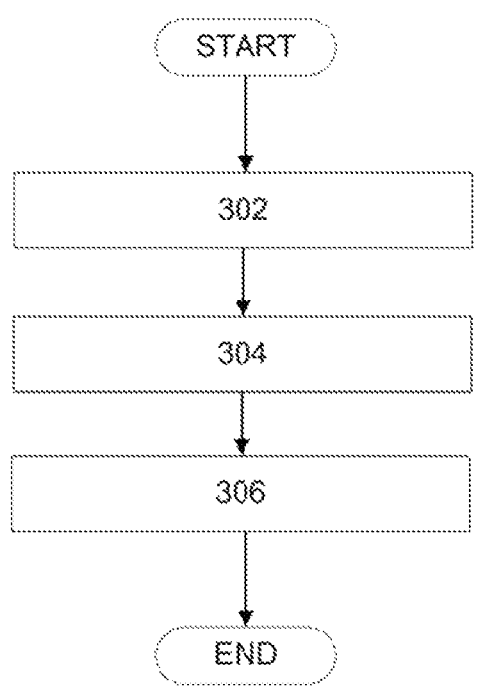
FIG. 3 is a flow diagram depicting steps taken to implement various examples.

FIG. 3 is a flow diagram of operation in a system according to various examples, in discussing FIG. 3, reference may be made to the diagrams of FIGS. 1 and 2 to provide contextual examples, implementation, however, is not limited to those examples. Starting with FIG. 3, a subscription is received. The subscription is to authorize a computing device to dispense and/or consume a subscription quantity of a resource (block 302). Referring back to FIGS. 1 and 2, the receiving module 108 (FIG. 1), or the receiving instructions 208 (FIG. 2), when executed by processing resource 214 (FIG. 2), may be responsible for implementing block 302.

Continuing with FIG. 3, an authorization quantity of the resource is calculated according to a formula that considers a parameter attributable to the subscription. The authorization quantity is to authorize consumption and/or dispensation of the resource at the device (block 304). Referring back to FIGS. 1 and 2, the calculation module 110 (FIG. 1), or the calculation instructions 210 (FIG. 2), when executed by processing resource 214 (FIG. 2), may be responsible for implementing block 304.

Continuing with FIG. 3, the authorization quantity is sent to the device (block 306). Referring back to FIGS. 1 and 2, the sending module 112 (FIG. 1), or the sending instructions 212 (FIG. 2), when executed by processing resource 214 (FIG. 2), may be responsible for implementing block 306.

Figure 4:
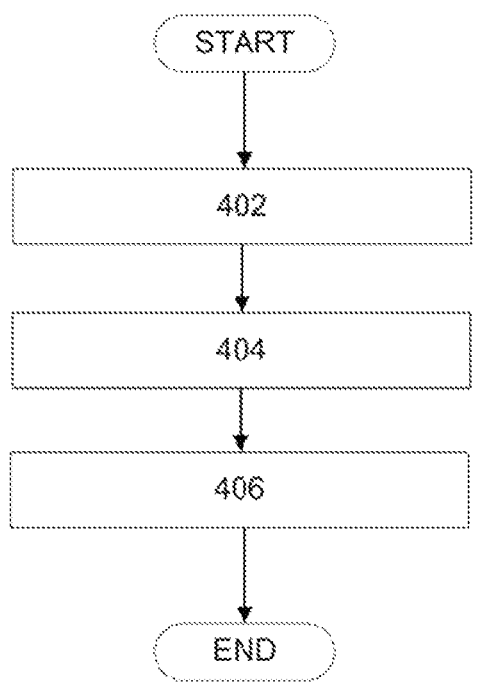
FIG. 4 is another flow diagram depicting steps taken to implement various examples.

FIG. 4 is a flow diagram of operation in a system according to various examples. In discussing FIG. 4, reference may be made to the diagrams of FIGS. 1 and 2 to provide contextual examples. Implementation, however, is not limited to those examples. Starting with FIG. 4, a subscription is received. The subscription is to authorize a network-connected printer to at least one of dispense or consume a marking element, (block 402). Referring back to FIGS. 1 and 2, the receiving module 108 (FIG. 1), or the receiving instructions 208 (FIG. 2), when executed by processing resource 214 (FIG. 2), may be responsible for implementing block 402.

Continuing with FIG. 4, an authorization quantity of the marking element is calculated utilizing a formula that considers a parameter attributable to the subscription. The authorization quantity is to authorize at least one of a dispensation or consumption of the marking element at the printer (block 404). Referring back to FIGS. 1 and 2, the calculation module 110 (FIG. 1), or the calculation instructions 210 (FIG. 2), when executed by processing resource 214 (FIG. 2), may be responsible for implementing block 404.

Continuing with FIG. 4, a packet that includes the authorization quantity is sent to the printer via the network (block 406). Referring back to FIGS. 1 and 2, the sending module 112 (FIG. 1), or the sending instructions 212 (FIG. 2), when executed by processing resource 214 (FIG. 2), may be responsible for implementing block 406.

Various modifications may be made to the disclosed examples and implementations without departing from their scope. Therefore, the illustrations and examples herein should be construed in an illustrative, and not a restrictive, sense.

What is claimed is:

1. A system, comprising:
a processor;
a receiving module, the receiving module a combination of hardware and programming to receive a subscription, the subscription to authorize a computing device to at least one of dispense or consume a subscription quantity of a resource;
a calculation module, the calculation module a combination of hardware and programming to calculate, according to a formula that considers a parameter attributable to the subscription, an authorization quantity of the resource, wherein the authorization quantity is to authorize at least one of a dispensation or consumption of the resource at the device; and
a sending module, the sending module a combination of hardware and programming to send the authorization quantity to the device,
wherein the parameter is one from the set of
a duration that the subscription has been in effect, and
a subscription state in effect for the device, wherein the subscription state is one from the set of a resource supplies ordered and not installed state, a resource supplies ordered and installed state, a subscription suspended state, a subscription cancelled state, a subscription active state, a subscription to be cancelled state, a payment problem state and a no payment problem state.

2. The system of claim 1, wherein the device is a printer and resource is a marking element.

3. The system of claim 2, wherein the printer is a network-connected printer and a packet including the authorization quantity is sent via the network.

4. The system of claim 1, wherein the calculated authorization quantity is less than the subscription quantity.

5. The system of claim 1, wherein the authorization quantity is stated in terms of an authorized time of operation, or authorization of operation through a defined date.

6. The system of claim 1, wherein the parameter is a duration that the subscription has been in effect, and wherein the formula causes the authorization quantity to increase as the duration parameter is increased.

7. A non-transitory computer-readable storage medium comprising instructions that, when executed by a processor, cause a system to:
receive a subscription to authorize a computing device to at least one of dispense or consume a subscription quantity of a resource;
calculate, according to a formula that considers a parameter included within the subscription, an authorization quantity of the resource,
wherein the authorization quantity is to authorize at least one of a dispensation or consumption of the resource at the device,
wherein the parameter is a subscription state in effect for the device, the subscription state being one from the set of a resource supplies ordered and not installed state, a resource supplies ordered and installed state, a subscription suspended state, a subscription cancelled state, a subscription active state, a subscription to be cancelled state, a payment problem state and a no payment problem state; and send to the device a packet including the authorization quantity.

8. The medium of claim 7, wherein the parameter is a subscription state in effect for the device that is one of a resource supplies ordered and not installed state, or a resource supplies ordered and installed state; and wherein the formula causes the calculated authorization quantity to be lower when the subscription state is the resource supplies ordered and not installed state than when the subscription state is the resource supplies ordered and installed state.

9. The medium of claim 7, wherein the parameter is a subscription state in effect for the device that is one of a subscription suspended or subscription cancelled state, and the calculated authorization quantity is zero.

10. The medium of claim 7, wherein the parameter is a subscription state in effect for the device that is one of a subscription active and a subscription to be cancelled state, and wherein the formula causes the calculated authorization quantity to be lower when the subscription state is the subscription to be cancelled state than when the subscription state is the subscription active state.

11. The medium of claim 7, wherein the parameter is a subscription state in effect for the device that is one of a payment problem state or a no payment problem state, and wherein the formula causes the calculated authorization quantity to be lower when the subscription state is the payment problem state than when the subscription state is the no payment problem state.

12. A processor-implemented method, comprising:

receiving a subscription, the subscription to authorize a network-connected printer to at least one of dispense or consume a marking element;

calculating, utilizing a formula that considers a parameter attributable to the subscription, an authorization quantity of the element, wherein the authorization quantity is to authorize at least one of a dispensation or consumption of the element at the printer; and sending to the printer, via the network, a packet including the authorization quantity, wherein the parameter is a duration that the subscription has been in effect.

13. The method of claim 12, wherein the calculated authorization quantity is stated in terms of pages authorized for printing.

14. The method of claim 12, wherein the authorization quantity is stated in terms of marking element quantity.

* * * * *